United States Patent
Liu et al.

(10) Patent No.: US 7,826,451 B2
(45) Date of Patent: *Nov. 2, 2010

(54) METHOD OF STATELESS GROUP COMMUNICATION AND REPAIR OF DATA PACKETS TRANSMISSION TO NODES IN A DISTRIBUTION TREE

(75) Inventors: Zhen Liu, Tarrytown, NY (US); George V. Popescu, Union, NJ (US)

(73) Assignee: International Business Machines Corporation, Armonk, NY (US)

( * ) Notice: Subject to any disclaimer, the term of this patent is extended or adjusted under 35 U.S.C. 154(b) by 248 days.

This patent is subject to a terminal disclaimer.

(21) Appl. No.: 12/014,131

(22) Filed: Jan. 15, 2008

(65) Prior Publication Data
US 2008/0112435 A1 May 15, 2008

Related U.S. Application Data

(63) Continuation of application No. 10/674,335, filed on Sep. 30, 2003, now Pat. No. 7,355,968.

(51) Int. Cl.
H04L 12/28 (2006.01)
(52) U.S. Cl. .................................... 370/390
(58) Field of Classification Search ........... 370/392, 370/225, 272, 228, 400, 401, 351, 254, 252, 370/238, 432; 709/236, 321, 238; 714/4, 714/7, 25
See application file for complete search history.

(56) References Cited

U.S. PATENT DOCUMENTS

| 5,355,371 | A | 10/1994 | Auerbach et al. |
| 5,995,503 | A | 11/1999 | Crawley et al. |
| 6,751,747 | B2 | 6/2004 | Li |
| 6,798,739 | B1 | 9/2004 | Lee |
| 7,185,077 | B1 | 2/2007 | O'Toole et al. |
| 7,355,968 | B2 * | 4/2008 | Liu et al. .............. 370/225 |

* cited by examiner

*Primary Examiner*—Chi H Pham
*Assistant Examiner*—Alexander Boakye
(74) *Attorney, Agent, or Firm*—Gibb I.P. Law Firm, LLC

(57) ABSTRACT

Disclosed is a method for stateless group communication based on constructing and encoding sender based trees. The headers obtained by encoding the distribution trees are inserted in each communication packet. The encoding allows partial or full decoding of the distribution trees. The encoding is performed to minimize the overhead of the header and the processing required for partial decoding of the distribution tree. The invention includes mechanisms for processing the encoded header at intermediate nodes in the distribution tree in order to determine the next communication nodes and mechanisms for modification and re-encoding of the trees in order to provide resilience to network failures or to react to application level specified conditions.

29 Claims, 4 Drawing Sheets

METHOD OF STATELESS GROUP COMMUNICATION AND REPAIR OF DATA PACKETS TRANSMISSION TO NODES IN A DISTRIBUTION TREE

CROSS REFERENCE TO RELATED APPLICATIONS

This application is a continuation of U.S. application Ser. No. 10/674,335 filed Sep. 30, 2003, the complete disclosure of which, in its entirety, is herein incorporated by reference, which is related to pending U.S. patent application Ser. No. 10/334,254, filed Dec. 31, 2002, entitled "Smart Event Parser For Autonomic Computing" to Genady Grabamik et al.,", and pending U.S. patent application Ser. No. 0/674,334, filed Sep. 30, 2003, entitled "Method of Establishing Transmission Headers For Stateless Group Communication". The foregoing applications are assigned to the present assignee, and are all incorporated herein by reference.

BACKGROUND OF THE INVENTION

1. Field of the Invention

The present invention generally relates to communications and more particularly to the use of headers containing encoded distribution trees for delivery of data packets to a group of nodes that will receive the data packets.

2. Description of the Related Art

Application level multicasting using network overlays has recently been proposed as an alternative to IP (internet protocol) multicasting. Communication protocols that employ end-systems as data forwarding elements have demonstrated better flexibility and scalability at the expense of a small degradation in communication efficiency (e.g., increased network delays). Most of these protocols maintain state information at the nodes involved in a group communication session.

SUMMARY OF THE INVENTION

The invention comprises a mechanism for stateless group communication based on constructing and encoding sender based trees. The headers obtained by encoding the distribution trees are inserted in each communication packet. The encoding allows partial or full decoding of the distribution trees. The encoding is performed to minimize the overhead of the header and the processing required for partial decoding of the distribution tree. The invention includes mechanisms for processing the encoded header at intermediate nodes in the distribution tree in order to determine the next communication nodes and mechanisms for modification and re-encoding of the trees in order to provide resilience to network failures or to react to application level specified conditions.

More specifically, the invention establishes transmission headers for stateless group communication of data packets to nodes by encoding a distribution tree, creating a header that includes the encoded distribution tree, and adding the header to the data packets to be distributed to the distribution tree. The invention creates the distribution tree at a sender node based the knowledge of the addresses of receiver nodes. The encoding process comprises sequentially entering addresses of nodes during a per-level traversal of the distribution tree starting from the root of the distribution tree.

The methodology modifies the header as the data packet is distributed down the distribution tree to remove encoded information concerning upper distribution levels of the tree. Thus, the invention decodes a portion of the encoded distribution tree as each node receives the data packet and re-encodes the distribution tree as the node passes the data packet to another node down the distribution tree. The distribution tree controls the order in which the nodes receive the data packets. Thus, by controlling the order in which the nodes receive the data packets, the encoding of the distribution tree permits the nodes to process the data packets in an order specified by the tree hierarchy. The invention processes the encoded header containing the distribution tree at each node, thereby indicating to which node the data packet should be next transferred.

In addition, the invention can modify the header as the data packet is distributed down the distribution tree to repair the distribution tree. Thus, the invention can remove failed nodes by forwarding the data packet to the node to which a failed node would have forwarded the data packet.

The stateless multicast communication method can be used in collaborative applications for distribution of application state information and replication of content information. Thus, the invention can be used to distribute application state information using data packets and/or include additional protocols in the data packets.

BRIEF DESCRIPTION OF THE DRAWINGS

The foregoing and other objects, aspects and advantages will be better understood from the following detailed description of a preferred embodiment(s) of the invention with reference to the drawings, in which.

DETAILED DESCRIPTION OF PREFERRED EMBODIMENTS OF THE INVENTION

Figure 1:
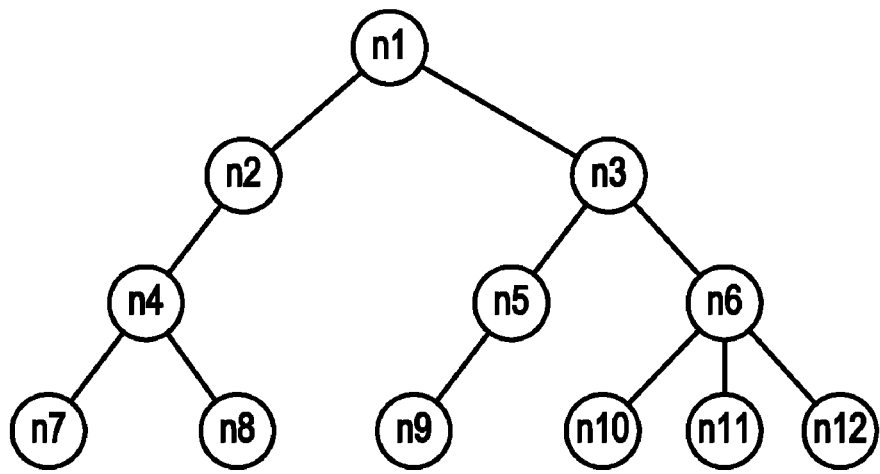
FIG. 1 is a schematic diagram of a distribution tree according to the invention.

As mentioned above, some protocols maintain state information at the nodes involved in a group communication session. The invention provides group communication by fully encoding communication trees at the sender to allow stateless operation. One of the advantages of stateless group communication comes from reducing the signaling of the control path. The second is the added flexibility of dynamic modification of communication trees.

One type of application in which the invention excels involves small communication groups where the data dissemination is performed according to a specified ordering of the receiver set. An example of such an application is collaborative information processing. In this case, data dissemination and processing at intermediate nodes is governed by the application. Additional examples of applications that benefit from the invention include distributed management/probing of networks.

The group communications that are used with the invention provide that the sender has full knowledge of each receiver's addresses (e.g., node address). Each new receiver joins the distribution tree by communicating to the sender their location (network address), network related attributes and their communication topic. The source maintains an index of receiver addresses and their associated properties. The preferred method of indexing of receiver nodes addresses is by using a hash table, although other indexing methods may be used. For each new join, the source inserts the address of the new node and its properties in the index. The sender can perform grouping of receivers according to application specified mechanisms, for example, as discussed below with respect to FIG. 5.

A receiver node leaves the communication tree by notifying the source node with a leave message. Upon receiving the leave message from a receiver, the source deletes its entry from the index. In addition, the source will reconstruct new communication trees, which do not include the node that left the group.

Data packets are generated at the source node and distributed in the communication tree associated with each group. In addition, the source node can disseminate to the distribution tree data received from other nodes. The source will send the data to the group that has the same identifier as the packet received at the source. Upon receiving the packet the source will look-up for the distribution tree with the identifier contained in the received packet. In addition, the source can identify the distribution tree based on a set of attributes contained in the packet. In this case, the indexing of distribution trees uses a domain of attribute values, each distribution tree being associated with a domain. For each packet, the source will identify the domain that contains the attributes values included in the packet and send data to the distribution tree corresponding to this domain.

In order to perform application level forwarding without maintaining group communication states at intermediate nodes participating in the forwarding, the full distribution tree is encoded at the sender and included in each transmitted packet. The invention applies to any method of constructing distribution trees. The header format depends on the encoding method used. The size of the header varies with the number of addresses included in the header. This allows efficient encoding of arbitrary trees at the expense of increased header processing at intermediate communication nodes.

The inventive header encoding method constructs the routing header by sequentially entering the addresses of nodes visited during a per level traversal of the distribution tree starting from the root. The sequential encoding of the tree uses special delimiters for fast header processing at the forwarding nodes. Level delimiters separate the siblings that can be reached after the same number of network hops. In each level, the nodes with a common parent are delimited by group separators. A group contains all the nodes that receive the packet from a common parent.

The encoding of the distribution tree presented above allows efficient header processing. The IP addresses of the nodes in the distribution tree are inserted sequentially separated in groups and levels. Here the invention performs header construction for an arbitrary communication tree. The invention enqueues the children nodes and group separators during tree traversal and inserts IP addresses and separators when dequeuing the nodes. Pseudo code for header construction is as follows:

```
1) Start at the root node; root.level_count=1; Level_count = 1;
2) enqueue the current node
3) While (queue not empty)
    Dequeue( node)
    If(node.level_count!= Level_count) Insert level_separator;
    Level_count++;
    Insert IP address of the dequeued node into Mcast_header
    while (parent has children)
    {
        If (first _child) enqueue group_separator;
        child_node.level_count=node_level_count+1;
        Enqueue (child node );
    }
```

This process creates a multicast header where each new level and each new group starts with a separator. Separators can be identified by their size and/or value. To minimize the header length, the size of the separators should be smaller than that of the receiver address. The overhead of the encoding is $\log(N)+N/2$ for this case.

The packet transmitted from the sender is processed at each node in the communication tree in order to retrieve the addresses of the next hop nodes. To reduce communication overhead, the header can also be modified (shortened by a tree level) during packet processing. Each node can locate its children (next hop nodes it needs to forward data to) by performing the header processing steps shown below:

a) detect the position p of its address in the multicast header, b) removes the IP addresses of the level it belongs to, c) searches for the group G with the same position p in the next level, d) forward the processed header and the payload to all addresses contained in group G.

Below is the detailed process for header decoding:

```
1) While (IP_addr (header_node(k)) != IP_addr (current node))
    k++; Remove header_node;
2) While (header_token != level_separator) remove header_node;
3) Grp_count=0;
4) while (count < k) {header_token++; if (header_token==
    group_separator) count++;}
5) while (header_token != group_separator) forward_packet
    (header_token++)
```

A header token can be a node or a separator. Header content is parsed sequentially to detect group and node separators. The processing time increases with the distance (in communication hops) from the sender. For node in position k in level L, the processing time is proportional to the size of the current level and k/(current level size) of the next level. The overall header processing effort is proportional to $N*N$ where N is the number of nodes in the tree.

The invention has a per level header encoding method. This encoding method constructs the multicast header by inserting an encoding of the tree in front of receiver addresses. The tree encoding contains the position in the tree (for a breadth/per level traversal) of the current node followed by the sequence representing the number of children corresponding to each node. The sequence is constructed at the sender using a per level traversal of the distribution tree (FIG. 1). The header format is <position of the node (1 byte)><tree encoding sequence (~N/2 bytes)><receiver addresses (4N bytes)>. The format can be fixed—only the position of the current node is changed between successive hops, or variable—tree encoding sequence list of receivers are shortened between successive nodes.

At node n[k] (assuming the k indicates the position in a per level traversal order) the header is <k><1,2,1,2,2,1,3><addr [n1], ... >. Let s[k] be the position k-th entry in the sequence of tree encoding. The addresses of the next hop nodes is obtained by searching the list of receiver addresses to locate s[k+1] addresses. The starting address of next hop nodes is (s[i]), i=1 . . . k. The first entry of the new header is the position of the next hop node in the address list. The rest of the header can be copied from the current node or modified by removing the entries from the tree encoding sequence and the addresses up to the current node. Therefore, the sequence <1,2,1,2,2,1, 3> relates to each of the nodes shown in FIG. 1 as follows (the node(s) associated with each character in the sequence are shown in brackets): <1 (n1), 2 (n2-n3), 1 (n4), 2 (n5-n6), 2 (n7-n8), 1 (n9), 3 (n10-n12)>. The process for encoding the tree in header construction follows:

```
1) Start at the root node; root.level_count=1; seq_header=null;
   addr_header=null;
2) enqueue the current node
3) While (queue not empty)
      Dequeue(node)
         Insert IP address of the dequeued node into addr_header
            Insert crt_node .children_Number into seq_header;
            while (parent has children)
               enqueue (child node );
4) concatenate (seq_header, addr_header)
```

At each intermediate hop the header is processed (m_addr [i] contains the address of the k-th next hop node). Pseudo code for header the additional header decoding is as follows:

```
1) k=header[0]; grp_size=header[k+1];
2) while(header[k] != end_of_sequence)
   k++;i=0;pos=k+ ✥(i−1,k)header[i]*4;
3) while (i<grp_size)
      {M_addr [i] = {header[pos+4*i]... header[pos+3+4*i]} ;
      i++;
      n_header[i]=header; n_header[i][0]=k+i ;}
```

With respect to header decoding process (fixed header size), the modified process that reduces the size of the header at each intermediate node is:

```
1) k=header[0]; grp_size=header[k+1];
2) while(header[k] != end_of_sequence) k++; i=0; pos = k+4;
3) while (i<grp_size)
      {M_addr [i] = { header[pos+4*i]... header [pos+3+4*i]} ; i++;
      m=0; k=header[0];
Copy the encoding sequence into the sequence from position
corresponding to current node+1
Copy the addresses from the current group to the end of the header
      }
```

The headers are encoded using a preorder traversal of the group communication tree. The format of the encoding is <level (byte)><IP addr of the node (4 bytes)>, introducing therefore a 25% overhead (N bytes). At each intermediate routing point the header is processed such that only the nodes in the subtree rooted at the current node are kept (with the levels adjusted correspondingly). At each node a complete scan of the communication header is required. The next hop nodes can be identified by the value of their level. For each new child (next hop node), a new header is generated which contains only the corresponding subtree. The length of the header and the amount of processing per hop decreases as the packet reaches nodes closer to the last hop. The subtrees are obtained as the sequence of nodes between two occurrences of next level nodes. The following shows the recursive method that performs header encoding:

```
1. Start at root node
Fctn: Visit_node (node, label)
{Insert label of current node;
insert addr. of current node}
      If no children return
Fctn: Traverse_node( )
{
Visit_node(node, label); increment label;
If (no children) return;
while(node has children)
traverse_node(child)
}
```

Figure 2:
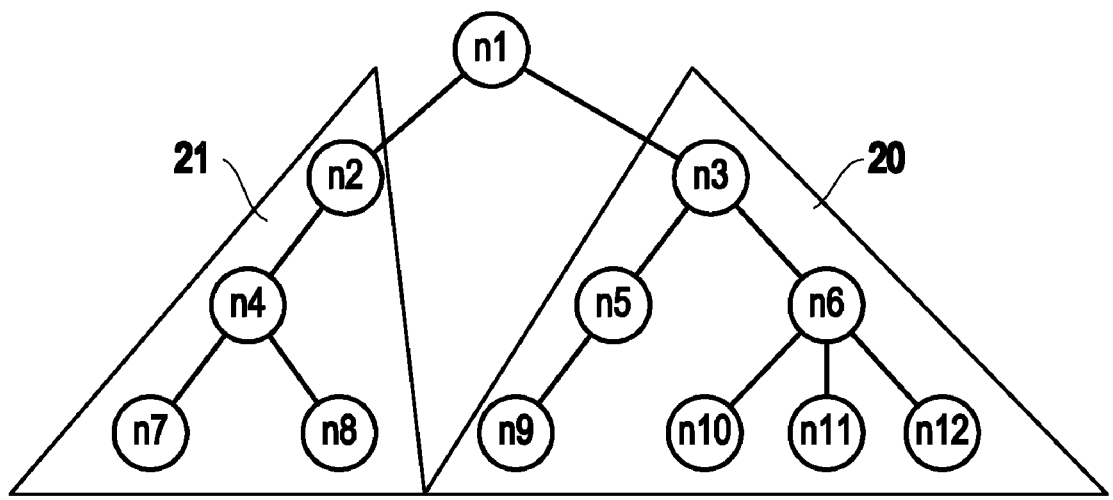
FIG. 2 is a schematic diagram of a distribution tree according to the invention.

FIG. 2 shows such subtrees 20, 21. The process for header processing at intermediate hops is shown below, where the level of the current node is 0); the position of the search node is p; and the current header being constructed is k.

```
1. Start at label 0; k=0; p=0;
2. while (sNode[p].label != terminator)
   {
      If (sNode[p].label = = 1)
      /* Construct next hop header */
      {next_address[k]= sNode[p].addr; k++}
      while(sNode[p].label != 1)
         {Insert sNode[p] into header[k];
         p++;}
   }
```

The invention can also cache active routes for efficient data forwarding. The method described above allows maximum flexibility in specifying the routing path of individual data packets. However, for some applications the configuration of the distribution tree does not change often between successive data transmissions. To increase data forwarding efficiency, the intermediate nodes can maintain long-lived TCP (transmission control protocol) connections for the next hop nodes involved in each distribution tree. The next hop connections are indexed based on the node identifier and entered in a routing hash table. The cached routes are added to the hashtable with every change in the header received at the forwarding nodes. The routes are removed from the hashing table according to an expiry policy that depends on the average life time of next hop node connection.

In addition, the invention can modify the header as the data packet is distributed down the distribution tree to repair the distribution tree. More specifically, the invention decodes the header, as discussed above. The invention checks to see if a faulty node is present, and the invention revises (repairs) the header to bypass the faulty nodes. Finally, the invention forwards the data packet (with the revised distribution tree) thereby skipping or bypassing the faulty nodes. Thus, the invention can remove failed nodes by forwarding the data packet to the node to which a failed node would have forwarded the data packet.

Thus, the invention provides header processing for resilient stateless overlays. Dynamics of end-systems nodes and link failures impact the performance of the overlay communication method described above. The invention increases the resilience of the group communication methods by providing repair mechanisms for node faults. Network and end-system forwarding faults can be repaired by changing the headers at the sender or on the fly at forwarding nodes. The first method assumes that node and network faults trigger events reported at the sender. Upon reception of these failed node events, the sender performs a new header construction that takes into account reported faults. In case of many-to-many group communication (as in networked Virtual Environments) a server receives continuously messages from all receivers in the group, aggregates and sends them to the interested peers. The sender can infer in this case node or network faults from the failure to receive packets from receivers (assuming a minimum heartbeat frequency is required for group communication).

The dynamic repair of communication trees requires additional header processing mechanisms to be performed in case a forwarding end-system detects a failure of a next hop node. The assumption here is that a node can detect failures on the links connecting it to its children. The header processing mechanisms depends on header construction and header processing at intermediate nodes. Assuming there are no bandwidth constraints to be satisfied, the node can simply forward data to the next hop children of the failed node. The process below presents an example of the header processing repair method for per level traversal of the trees, at a node that detected a fault to one of its children.

1. Detect the position of the fault node fnode in the current tree level
2. Apply Header_Processing process for the fnode (determine the group of nodes with the same rank in the next level and forward to all nodes in the group).

Figure 3:
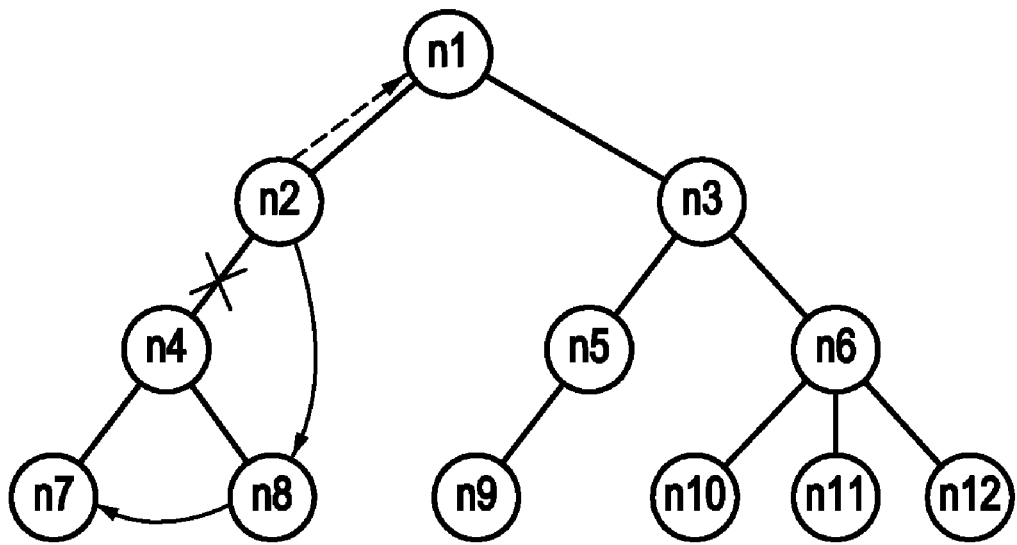
FIG. 3 is a schematic diagram of a distribution tree according to the invention.

For the second method of per level construction, the location of the faulty node requires address matching after the position of the next hop subgroup is determined. Once the location in the per level sequence of the faulty node is determined, the header processing method is applied again (for the new position) to determine its next hop addresses. In addition, it is possible to re-organize the subtree rooted at the current node such that a leaf node (n8) is promoted in the place of the current faulty node (n4), and the faulty node is skipped and removed from the tree as shown in FIG. 3.

Figure 4:
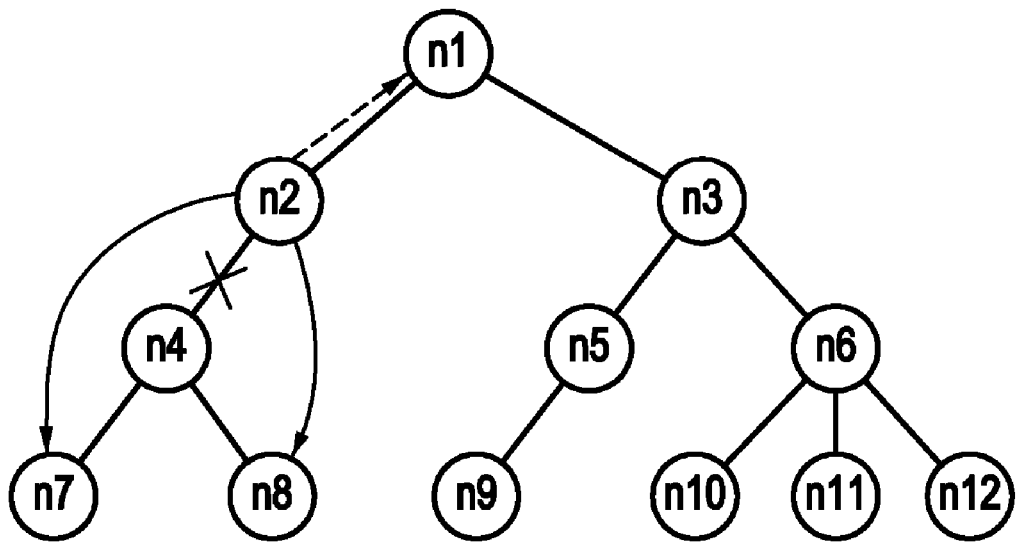
FIG. 4 is a schematic diagram of a distribution tree according to the invention.

For depth first header construction, the repair process locates the level 2 nodes (n7-n8) that are after the faulty level 1 node (n4) and forwards data from node n2 directly to these nodes (n7-n8). Detection of the faulty node (n4) requires searching among node addresses of the level one node (n2). The header for each of these transmissions includes the subtrees corresponding to level two nodes, as shown in FIG. 4.

The additional group communication header for stateless group communication reduces data payload of the packets proportional to the number of receivers. For conferencing applications, header requirements are low since the groups involve a small number of participants. However, the sender handles several sessions simultaneously. The receivers may change session membership frequently, which would trigger the sender to change the encoding of the multicast header. The changes in the membership can be handled by a join/leave mechanism or handled automatically by the sender based on an interest-based receiver grouping process.

Figure 5:
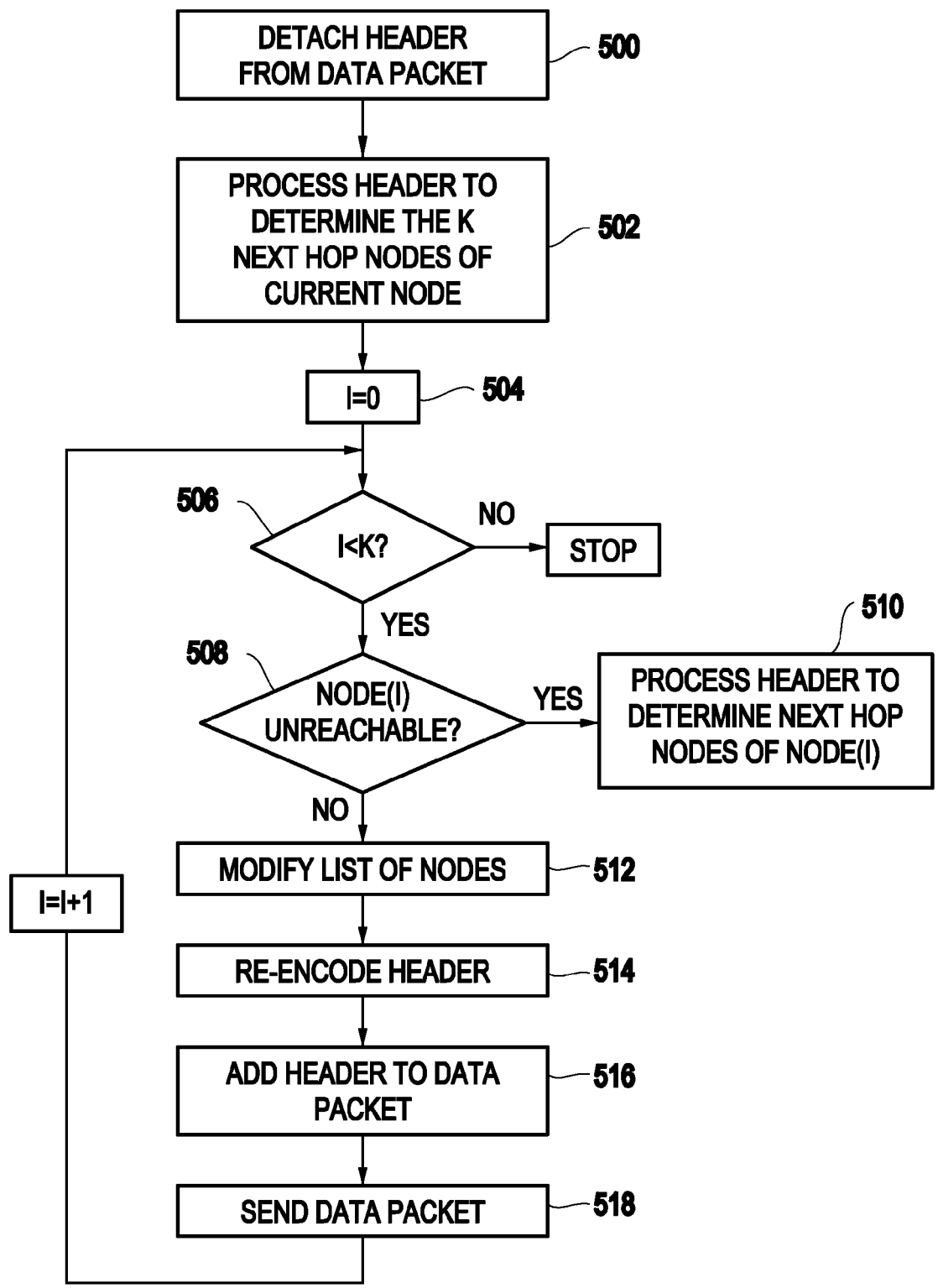
FIG. 5 is a flow diagram illustrating a preferred method of the invention.

FIG. 5 illustrates the processing that occurs in said each of the nodes. In item 500, the invention detaches the header from the data packet and in item 502 the invention processes the header to determine the K next hop nodes of the current node. As shown in item 504, before the loop processing, the invention sets I to 0. Once again, if I is less than K, this indicates that there is at least one more group that needs to be processed through items 508-518. Otherwise all groups have been processed and processing terminates as determined by decision block 506. If a node is unreachable as shown in decision blocks 508, the invention processes the header to determine the next hop node and thereby repair the header to skip or bypass the failed node as shown in item 510. In item 512, the invention modifies the list of nodes (as described above) and re-encodes the header in item 514. Next, the invention adds the header to the data packet (item 516) and sends the data packet (item 518). The processing then loops back, adding one to the value I and returns to decision item 506 to determine if another packet need to be processed through item 508-518.

Figure 6:
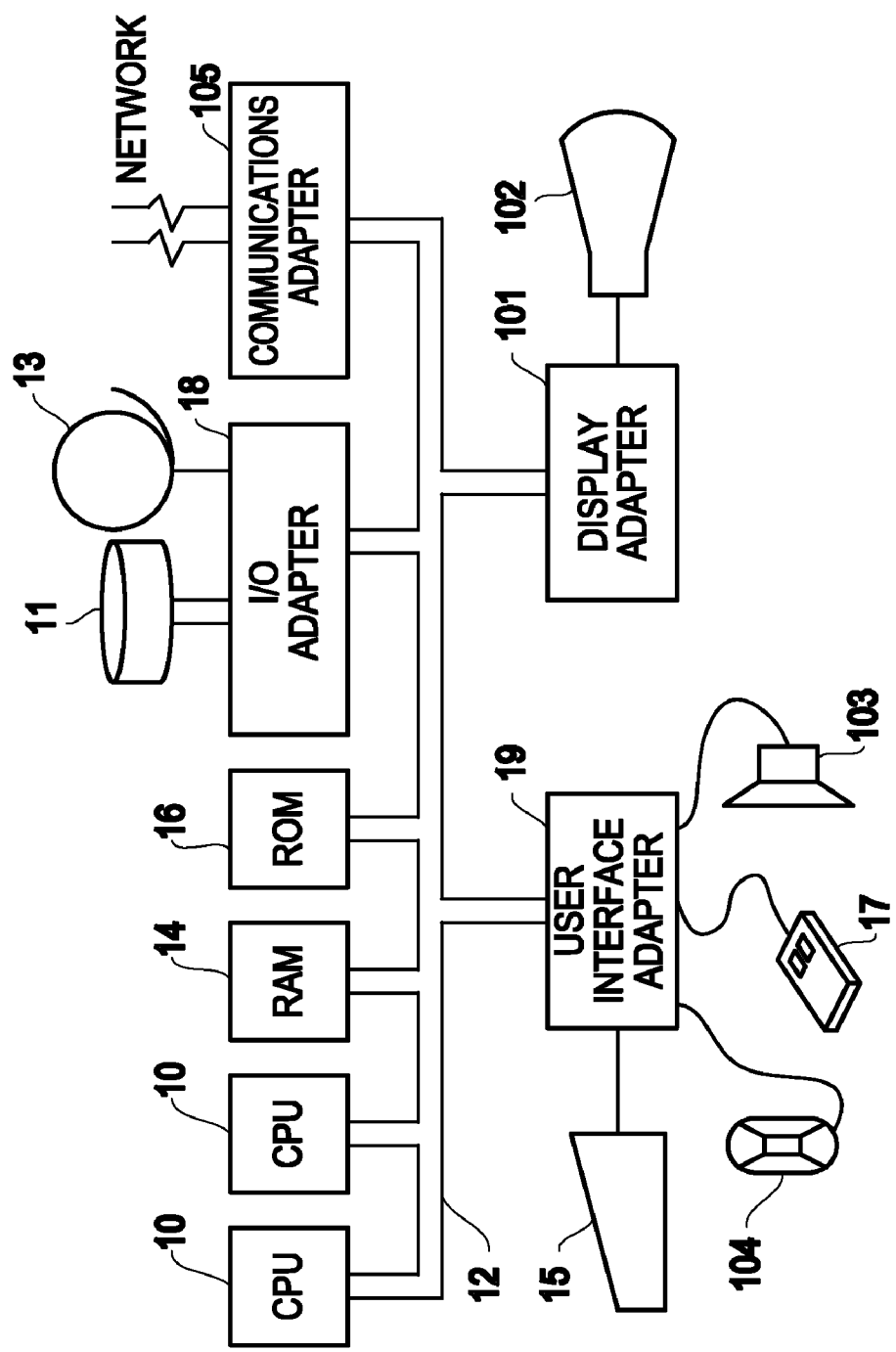
FIG. 6 is a hardware embodiment of the invention.

A representative hardware environment for practicing the present invention is depicted in FIG. 6, which illustrates a typical hardware configuration of an information handling/computer system in accordance with the subject invention, having at least one processor or central processing unit (CPU) 10. CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as touch screen device (not shown) to bus 12, communication adapter 105 for connecting the information handling system to a data processing network, and display adapter 101 for connecting bus 12 to display device 102. A program storage device readable by the disk or tape units, is used to load the instructions which operate on a wiring interconnect design which is loaded also loaded onto the computer system.

Thus, as shown above, the invention provides stateless group communication based on constructing and encoding sender based trees. The headers obtained by encoding the distribution trees are inserted in each communication packet. The encoding allows partial or full decoding of the distribution trees. The encoding is performed to minimize the overhead of the header and the processing required for partial decoding of the distribution tree. The invention includes mechanisms for processing the encoded header at intermediate nodes in the distribution tree in order to determine the next communication nodes and mechanisms for modification and re-encoding of the trees in order to provide resilience to network failures or to react to application level specified conditions.

While the invention has been described in terms of preferred embodiments, those skilled in the art will recognize that the invention can be practiced with modification within the spirit and scope of the appended claims.

What is claimed is:

1. A method of stateless group communication and repair of data packets to nodes in a distribution tree, said method comprising:
   encoding said distribution tree to produce an encoded distribution tree;
   creating a header including said encoded distribution tree;
   adding said header to a data packet to be distributed to said distribution tree; and
   modifying said header as said data packet is distributed down said distribution tree to repair said distribution tree.

2. The method in claim 1, wherein said repair comprises forwarding said data packet to a node to which a failed node would have forwarded said data packet.

3. The method in claim 1, further comprising modifying said header as said data packet is distributed down said distribution tree to remove encoded information concerning upper distribution levels of said distribution tree.

4. The method in claim 1, wherein said distribution tree controls the order in which said nodes receive said data packets.

5. The method in claim 4, wherein by controlling the order in which said nodes receive said data packets, said encoded distribution tree permits said nodes to process said data packets upon receipt.

6. The method in claim 1, further comprising, prior to said encoding process, creating said distribution tree at a sender node based upon a dynamic group of receiver nodes.

7. The method in claim 1, wherein said encoding comprises sequentially entering addresses of nodes during a per-level traversal of said distribution tree starting from the root of said distribution tree.

8. A method of stateless group communication of data packets to nodes in a distribution tree, said method comprising:
    encoding said distribution tree to produce an encoded distribution tree;
    creating a header including said encoded distribution tree;
    adding said header to a data packet to be distributed to said distribution tree;
    detecting failed nodes down said distribution tree;
    modifying said header as said data packet is distributed down said distribution tree to skip said failed node and remove said failed node from said encoded distribution tree.

9. The method in claim 8, wherein said modifying forwards said data packet to a node to which said failed node would have forwarded said data packet.

10. The method in claim 8, wherein said modifying comprises modifying said header as said data packet is distributed down said distribution tree to remove encoded information concerning upper distribution levels of said distribution tree.

11. The method in claim 8, wherein said distribution tree controls the order in which said nodes receive said data packets.

12. The method in claim 11, wherein by controlling the order in which said nodes receive said data packets, said encoded distribution tree permits said nodes to process said data packets upon receipt.

13. The method in claim 8, further comprising, prior to said encoding process, creating said distribution tree at a sender node based upon a dynamic group of receiver nodes.

14. The method in claim 8, wherein said encoding comprises sequentially entering addresses of nodes during a per-level traversal of said distribution tree starting from the root of said distribution tree.

15. A method of stateless group communication of data packets to nodes in a distribution tree, said method comprising:
    encoding said distribution tree to produce an encoded distribution tree;
    creating a header including said encoded distribution tree;
    adding said header to a data packet to be distributed to said distribution tree;
    detecting failed nodes down said distribution tree;
    modifying said header as said data packet is distributed down said distribution tree to pass said data packet around said failed node.

16. The method in claim 15, wherein said modifying forwards said data packet to a node to which said failed node would have forwarded said data packet.

17. The method in claim 15, wherein said modifying comprises said header as said data packet is distributed down said distribution tree to remove encoded information concerning upper distribution levels of said distribution tree.

18. The method in claim 17, further comprising, prior to said encoding process, creating said distribution tree at a sender node based upon a dynamic group of receiver nodes.

19. The method in claim 17, wherein said encoding comprises sequentially entering addresses of nodes during a per-level traversal of said distribution tree starting from the root of said distribution tree.

20. The method in claim 15, wherein said distribution tree controls the order in which said nodes receive said data packets.

21. The method in claim 20, wherein by controlling the order in which said nodes receive said data packets, said encoded distribution tree permits said nodes to process said data packets upon receipt.

22. A program storage device readable by machine, tangibly embodying a program of instructions executable by the machine to perform a method of extracting circuit characteristics from a circuit design, said method comprises establishing transmission headers for stateless group communication of data packets to nodes in a distribution tree, said method comprising:
    encoding said distribution tree to produce an encoded distribution tree;
    creating a header including said encoded distribution tree;
    adding said header to a data packet to be distributed to said distribution tree;
    detecting failed nodes down said distribution tree;
    modifying said header as said data packet is distributed down said distribution tree to skip said failed node and remove said failed node from said encoded distribution tree.

23. The program storage device in claim 22, wherein said modifying forwards said data packet to a node to which said failed node would have forwarded said data packet.

24. The program storage device in claim 22, wherein said modifying comprises modifying said header as said data packet is distributed down said distribution tree to remove encoded information concerning upper distribution levels of said distribution tree.

25. The program storage device in claim 22, wherein said modifying comprises decoding a portion of said encoded distribution tree as a node receives said data packet and re-encoding said encoded distribution tree as said node passes said data packet to another node down said distribution tree.

26. The program storage device in claim 22, wherein said distribution tree controls the order in which said nodes receive said data packets.

27. The program storage device in claim 26, wherein by controlling the order in which said nodes receive said data packets, said encoded distribution tree permits said nodes to process said data packets upon receipt.

28. The program storage device in claim 22, further comprising, prior to said encoding process, creating said distribution tree at a sender node based upon a dynamic group of receiver nodes.

29. The program storage device in claim 22, wherein said encoding comprises sequentially entering addresses of nodes during a per-level traversal of said distribution tree starting from the root of said distribution tree.

* * * * *